United States Patent
Yoon et al.

(10) Patent No.: US 10,561,976 B2
(45) Date of Patent: Feb. 18, 2020

(54) CARBON DIOXIDE COLLECTING APPARATUS AND METHOD USING INDEPENDENT POWER GENERATION MEANS

(71) Applicant: Korea Institute of Energy Research, Daejeon (KR)

(72) Inventors: Yeo Il Yoon, Daejeon (KR); Han Ki Kim, Jeju-si (KR); Sung Chan Nam, Daejeon (KR); Chan Soo Kim, Seoul (KR); Sung Yeoul Park, Daejeon (KR); Nam Jo Jeong, Jeju-si (KR); Young Eun Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 594 days.

(21) Appl. No.: 15/123,789

(22) PCT Filed: Feb. 25, 2015

(86) PCT No.: PCT/KR2015/001809
§ 371 (c)(1),
(2) Date: Nov. 18, 2016

(87) PCT Pub. No.: WO2015/133757
PCT Pub. Date: Sep. 11, 2015

(65) Prior Publication Data
US 2017/0072361 A1    Mar. 16, 2017

(30) Foreign Application Priority Data
Mar. 7, 2014    (KR) ................. 10-2014-0027207

(51) Int. Cl.
*B01D 53/14* (2006.01)
*B01D 53/62* (2006.01)
*B01D 53/96* (2006.01)

(52) U.S. Cl.
CPC ..... *B01D 53/1425* (2013.01); *B01D 53/1475* (2013.01); *B01D 53/62* (2013.01); *B01D 53/965* (2013.01)

(58) Field of Classification Search
CPC ............ B01D 53/1425; B01D 53/1475; B01D 53/62; B01D 53/965; Y02C 10/04; Y02C 10/06
See application file for complete search history.

(56) References Cited

U.S. PATENT DOCUMENTS

| | | | | |
|---|---|---|---|---|
| 2009/0199709 A1* | 8/2009 | Rojey | ............... | B01D 53/1425 95/46 |
| 2013/0177489 A1* | 7/2013 | Dube | ..................... | B01D 53/62 423/220 |
| 2014/0004403 A1* | 1/2014 | Yan | ........................ | H01M 8/20 429/107 |

FOREIGN PATENT DOCUMENTS

| | | | |
|---|---|---|---|
| CN | 103521053 A | * | 1/2014 |
| JP | 3000118 B2 | | 1/2000 |

(Continued)

OTHER PUBLICATIONS

Machine translation 103521053 accessed May 2019.*

(Continued)

*Primary Examiner* — Cabrena Holecek
(74) *Attorney, Agent, or Firm* — Panitch Schwarze Belisario & Nadel LLP

(57) ABSTRACT

A carbon dioxide capturing apparatus and process uses a self-generating power means that uses carbon dioxide in combustion exhaust gas through the convergence of a carbon dioxide absorption tower. The capturing apparatus and process also relies on ionic generator associated technology using a concentration difference between seawater and freshwater. The capturing apparatus and process result in increased production efficiency for electric energy and reduced costs for a carbon dioxide capturing process by (Continued)

increasing a concentration difference using an absorbent liquid for absorbing carbon dioxide and, at the same time, electricity is obtained through carbon dioxide which is a greenhouse gas.

12 Claims, 4 Drawing Sheets

(56) References Cited

FOREIGN PATENT DOCUMENTS

| JP | 2006213580 A | 8/2006 |
| JP | 2012087723 A | 5/2012 |
| KR | 101318831 B1 | 10/2013 |

OTHER PUBLICATIONS

International Search Report dated May 6, 2015 in International Application No. PCT/KR2015/001809.
Decision to Grant dated Oct. 16, 2015 in KR Application No. 1020140027207.

\* cited by examiner

【FIG. 1】
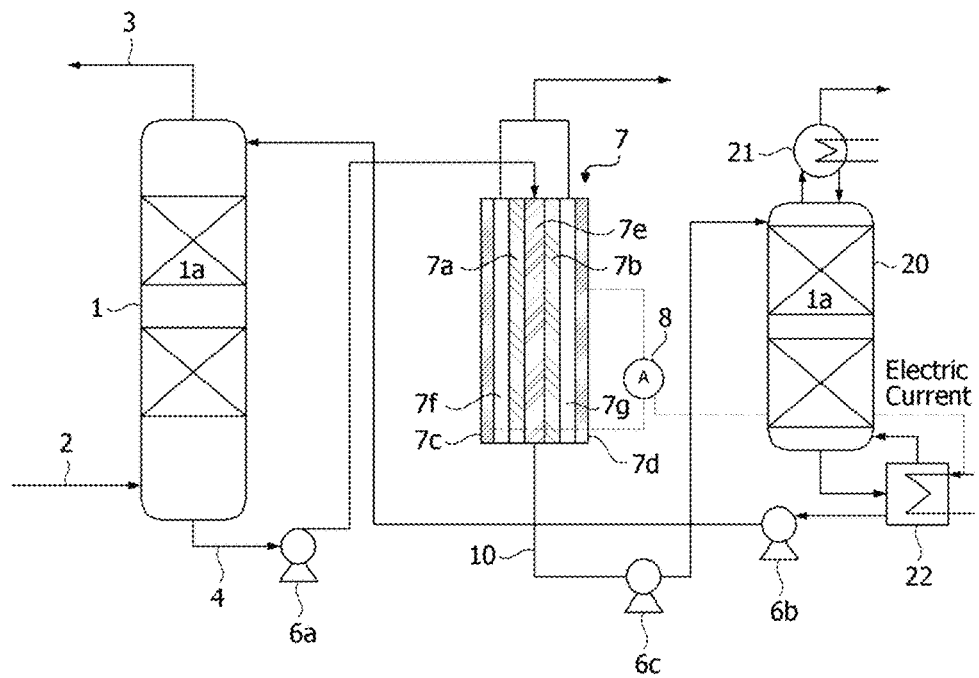
【FIG. 2】
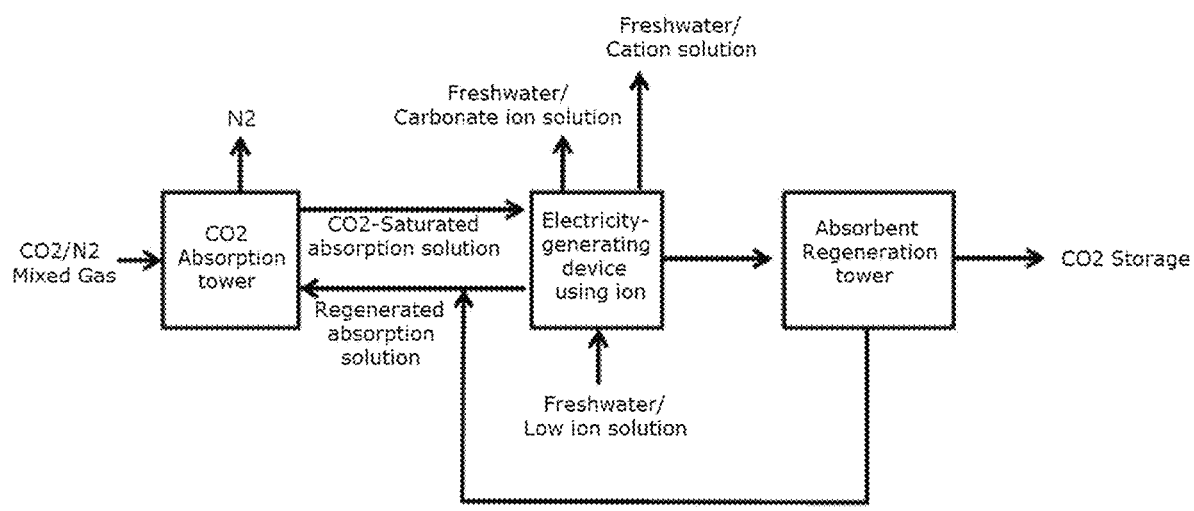

[FIG. 3]
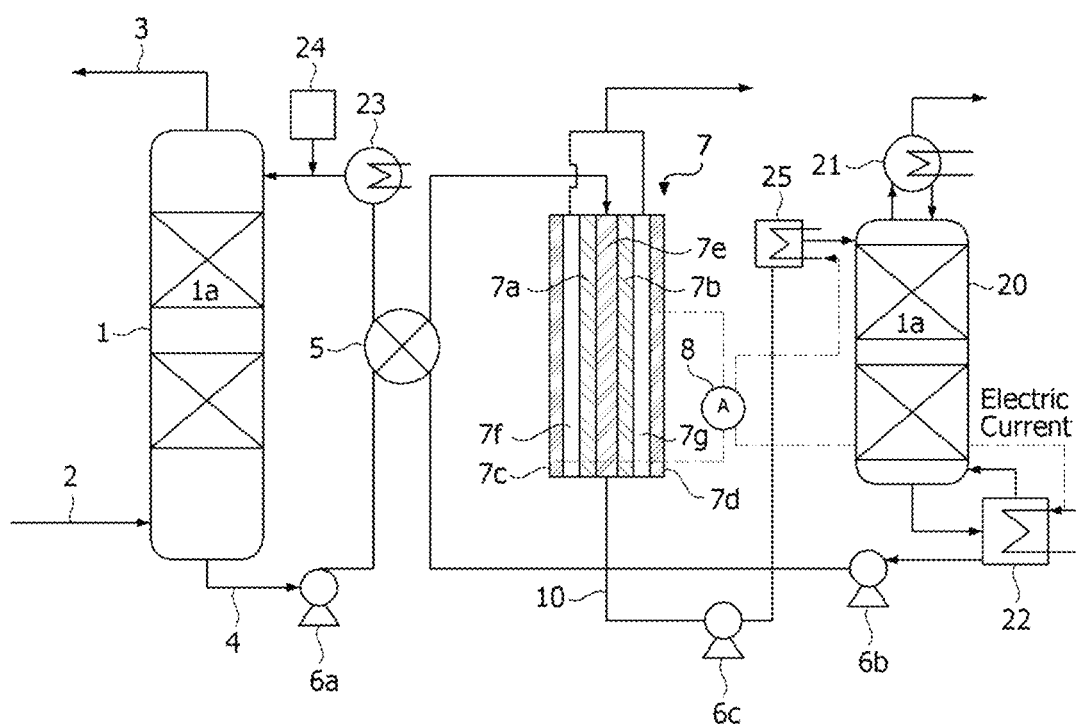

[FIG. 4]
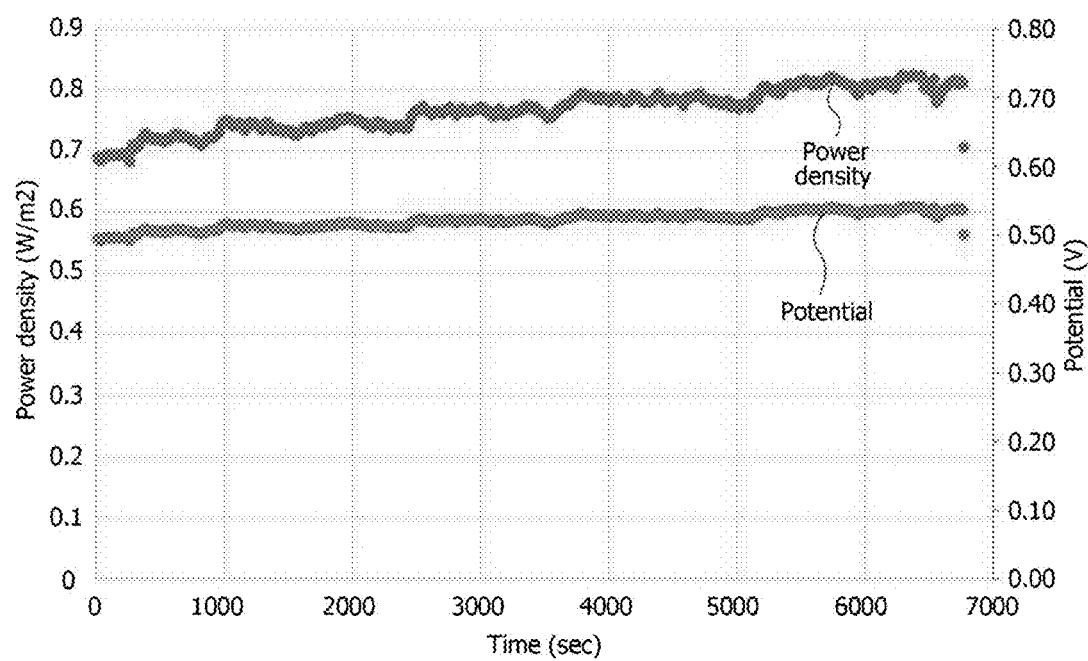

[FIG. 5]

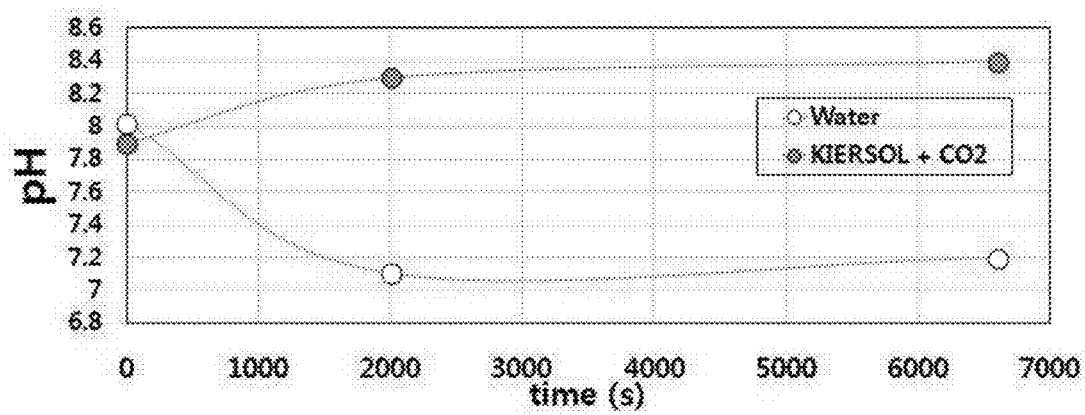

[FIG. 6]

| No. | Power density (W/m² of membrane) | Potential (V) | pH in KIERSOL | pH out KIERSOL | pH out water |
|---|---|---|---|---|---|
| 1 | KIERSOL \| water | 0.3-0.4 | 0.3-0.4 | 11.1 | 12.8 | 11.2 |
| 2 | KIERSOL+CO₂ \| water | 0.7-0.8 | 0.5 | 8.02 | 7.3 | 8.3 |

* Conditions :
* Membranes : Fumatech membranes (AEM, CEM)
* Electrode : Graphite electrodes (Anode, Cathode)
* Stacked numbers : 5 stacked
* Spacer thickness : 0.2mm
* Effective area per membrane : 0.0071m²
* Flow rate : 10 mL/min (Saline water), 5 mL/min (Fresh water), 10 mL/min (Electrode solution)

CARBON DIOXIDE COLLECTING APPARATUS AND METHOD USING INDEPENDENT POWER GENERATION MEANS

CROSS REFERENCE TO RELATED APPLICATION

This application is a Section 371 of International Application No. PCT/KR2015/001809, filed Feb. 25, 2015, which was published in the Korean language on Sep. 11, 2015, under International Publication No. WO 2015/133757 A1, and the disclosure of which is incorporated herein by reference.

TECHNICAL FIELD

The present invention relates to an apparatus and process for capturing carbon dioxide from among combustion exhaust gases. More particularly, the present invention relates to an apparatus and process for producing electricity and capturing carbon dioxide with a high degree of efficiency by utilizing carbon dioxide in combustion exhaust gases as a result of applying converging technologies associated with a carbon dioxide absorption tower, a regeneration tower and an electricity-generating device using ion.

BACKGROUND ART

Carbon dioxide, which is the most abundant of the six major greenhouse gases causing global warming, is an acidic gas, and there is a restriction on the number of facilities permitted to discharge carbon dioxide in large quantities. Carbon dioxide is generally generated as a result of burning fossil fuels and thus is mainly generated in industrial processes in which energy is generated or consumed in large quantities.

According to a strategy for actively responding to climate changes proposed by the International Energy Agency in 2012, it is expected that carbon dioxide, which needs to be reduced by about 22% by 2050 in order for human beings to survive, will be reduced using carbon capture and sequestration (CCS) technology. CCS technology will also need to be procured domestically in order to reduce by 2020 the expected quantity of greenhouse gas emissions or the 2020 Business as Usual (BAU) scenario by 30%.

CCS technology includes the three steps of capture/compression, transport, and sequestration of carbon dioxide. Among these steps, the method of capturing carbon dioxide is the most costly and thus has received the greatest focus in terms of their technical development. Several techniques for capturing carbon dioxide have been developed since the 1900's, some of which have been made available commercially. Analysis results show that carbon dioxide can be captured in large quantities, and the most economical method for capturing carbon dioxide in large quantities is the liquid absorption method. The liquid absorption method is mainly divided into the physical absorption method and the chemical absorption method, and the chemical absorption method associated with the present invention that are available commercially are listed in Table 1.

TABLE 1

| | Product names | Chemical solvents used | Process operating conditions |
| --- | --- | --- | --- |
| Chemical solvents | MEA | 2,5n monoethanol amine and inhibitors | 40° C., ambient intermediate pressures |
| | Amine guard | 5n monoethanol amine and inhibitors | 40° C., ambient intermediate pressures |
| | Econamine | 6n diglycol amine | 80 to 120° C., 6.3 MPa |
| | ADIP | 2-4n diisopropanol amine 2n methyldiethanol amine | 35 to 40° C., >0.1 MPa |
| | a-MEDA | 2n methyldiethanol amine | |
| | Flexsorb KS-1, KS-2, KS-3 | Hindered amine Hindered amine and promoters | |
| | Benfield and versions | Potassium carbonate and catalysts. Lurgi & Catacarb processes with arsenic trioxide | 70 to 120° C., 2 to 2.7 MPa |

Among these liquid absorption methods, the most commonly used liquid absorption methods include an alkanolamine method (in which monoethanolamine, diethanolamine, triethanolamine, etc. are used) and a Benfield method in which potassium carbonate is used. The alkanolamine method involves utilizing various types of alkanolamines that absorb carbon dioxide after the alkanolamines are mixed with water to prepare a 20 to 30% by weight solution. Because of its ability to rapidly absorb carbon dioxide, the alkanolamine method has been available for commercial use since the 1970's.

According to the alkanolamine method, a regeneration reaction requires injection of a very high amount of heat energy when the regeneration reaction is performed after a carbamate is formed in a form of a combination of an alkanolamine and carbon dioxide. Therefore, due to the high amounts of energy required to regenerate absorbents in these conventional amine-based absorption processes, there has been a demand for a reduction in capturing costs.

Referring to conventional carbon dioxide absorption processes, an exhaust gas enters a direct contact cooler so that the exhaust gas is cooled by refluxed water vapor. In this case, the exhaust gas is compressed in an air blower in order to cope with a pressure drop caused by reflux of the vapor and is allowed to flow in an absorption unit in a counter-current direction with respect to an absorbent. The absorbent flowing in the opposite direction of the exhaust gas chemically reacts with carbon dioxide present in the exhaust gas. A $CO_2$-lean gas enters a washing part of the absorption unit. In this case, water and the absorbent are separated at the washing part and then return to the absorption unit, and the washed gas is released into the air.

A $CO_2$-rich gas is pumped from the absorption unit into a lean/rich cross heat exchanger. In the cross heat exchanger, a $CO_2$-rich solution is heated and a $CO_2$-lean solution is cooled. To regenerate a solvent, the $CO_2$-rich solution is heated in a reboiler using low-pressure steam, and water and the absorbent in the mixture are evaporated by heating. A vapor of the absorbent and the steam enter a regenerator from the reboiler. In the regenerator, carbon dioxide is separated, and the vapor flows upwards at the time that the solution flowing downwards is heated. Some of the vapor and the carbon dioxide gas enter a washing part of the regenerator. In the washing part, the steam is condensed, the carbon dioxide is cooled, and condensed water returns to the regenerator. Also, the $CO_2$-lean solution leaves the reboiler, and is cooled in the cross heat exchanger. The solution is cooled further prior to being returned to the absorption unit.

As other absorbents for capturing carbon dioxide and the related process technology, liquid absorbents for capturing carbon dioxide (Brand name: KIERSOL; registered Trademark Nos. 40-2011-0046524 and 40-2011-0046525), each of which includes potassium carbonate as a main component, and the related process technology in registered Korean Patent Nos. 1157141, 1316543, 123938, and the like were independently developed. In processes using such absorbents, the energy consumed to regenerate the absorbents is approximately 2.5 GJ/t$CO_2$, which is at least 20% lower than that of the KS-1 process of Mitsubishi Heavy Industries. Ltd. (MHI, Japan), which currently possesses the best technology in the world (regeneration energy: 3.2 GJ/t$CO_2$). Also, since the absorbents are influenced less by sulfur oxide or halogen compounds included in small amounts in the combustion exhaust gas, it is possible for the absorbents to compensate for shortcomings of other absorbents currently available, such as the need to continuously supplement an absorbent during operation of the process, and to reduce operation costs.

Registered Korean Patent No. 712585 discloses a method of separating and recovering carbon dioxide from by-product gases produced at a steel mill using a chemical absorption method. Here, the technology using a low-graded array produced at the steel mill was applied to processes of absorbing carbon dioxide from the gas into a chemical absorption solution and heating the chemical absorption solution to separate carbon dioxide.

To solve problems of water shortage and energy depletion caused by global warming, methods of desalinating seawater, which accounts for most of the water on the Earth's surface, have also been studied. Distillation used in the Middle East and reverse osmosis widely used in the US, Japan, etc. are representative methods. However, reverse osmosis also consumes large amounts of energy because it involves using a high-pressure pump to obtain produced water. To address this problem, devices for recovering energy from high-pressure condensed water have been developed. Technology for producing electricity using a system similar to forward osmosis (FO) capable of dramatically reducing energy consumption, pressure-retarded osmosis (PRO) also known as energy generation technology, and electrodialysis (ED) in which anion exchange membranes and cation exchange membranes are installed alternately between negative electrodes and positive electrodes, but using the same system as forward osmosis (FO) in which there are two pairs each of flows supplied to the system and flows discharged from the system, and when a space between the ion exchange membranes is filled with seawater and river water, electrons are transferred from the negative electrodes to the positive electrodes with movement of ions due to a voltage difference generated by a difference in salinity between the seawater and the river water has been studied by Dr. Braun's team in Belgium, Dr. Hameler's team in the Netherlands, and the like.

Dr. Hameler's researcher team reported that mixing energy is released when two fluids having different compositions are mixed, and that although there is no technology for obtaining this energy from gases and liquids, when carbon dioxide mixed with combustion gas in the air is regarded as an energy source, it has a total annual worldwide capacity of 1,570 TWh. They also reported that pairs of porous electrodes, which include an anion-selective electrode and a cation-selective electrode, are used to obtain mixing energy from discharging gases including carbon dioxide, and electric energy is obtained between the selective porous electrodes when a flushing electrolyte is allowed to flow alternately with carbon dioxide or air. In addition, they reported that efficiency of this process is 24% when the electrolyte is non-ionized water and is 32% when the electrolyte is 0.25 M MEA. When the MEA solution is used as the electrolyte, an amount of maximum average energy is 4.5 mW/m$^2$, the value of which is remarkably higher than 0.28 mW/m$^2$ when water is used as the electrolyte.

Mixing two solutions of different composition leads to a mixture with a lower Gibbs energy content compared to the original two solutions. This decrease in the Gibbs function indicates the presence of mixing energy that can be harvested when a suitable technology is available. Up until now, the use of the mixing process as a source of energy has only been exploited for mixing of aqueous solutions with a different salinity. Mixing freshwater from rivers with seawater typically has an available work of −3 kJ per L of freshwater. Several technologies are being developed to exploit this source of energy using semipermeable membranes, ion-selective membranes, double-layer expansion and ion-selective porous electrodes. The latter technology is based on the use of capacitive electrode cell pairs; similar to those used in supercapacitors or in capacitive deionization (CDI) for water desalination. Another approach uses a fuel cell in which dry air at the cathode side is used to maintain operation as an electrochemical concentration cell.

Also, the researcher team has investigated the possibility of obtaining energy from the emission of carbon dioxide. Wherever hydrocarbon fuels or biomass are combusted, i.e. converted to $CO_2$ and water, emissions containing high $CO_2$ concentrations (5%-20%) compared to air (0.039%) are produced. This means that mixing combustion gas with air is an unexplored source of energy. To harvest this energy source the researcher team has suggested to contact both the $CO_2$ emission and air with an aqueous electrolyte. In aqueous solutions, $CO_2$ reacts with water to produce carbonic acid that itself dissociates into protons (W) and bicarbonate ($HCO_3^-$), which can further dissociate at high pH to carbonate ions ($CO_3^{2-}$). An increase of the $CO_2$ pressure in the gas leads to an increase of the concentration of the ions in the aqueous solution. The resulting difference in the ion concentration between the air-flushed solution and the $CO_2$-flushed solution can be used to gain electrical energy. Here, the researcher team has addressed the feasibility of obtaining additional energy from mixing $CO_2$ emissions and air.

The experimental setup consisted of two tanks containing the electrolyte. One tank was flushed with air while the other was flushed with 100% pure $CO_2$ gas. Each tank was connected to the capacitive cell via a peristaltic pump. Each of pumps, T connectors, and valves are configured to prevent backflow, a pH probe is installed in the inlet of a capacitive cell, The outlet of both pumps was connected to the inlet of the capacitive cell via a T shaped connector. In this case, Cell potential under open circuit conditions, or in a closed circuit via an external load, was measured with a multimeter, with the anion exchanging electrodes connected to the ground of the multimeter. In a capacitive cell composed of two capacitive electrodes, one electrode is covered with a cation exchange membrane (CEM) and the other is covered with an anion exchange membrane (AEM). A cell used in the experiments is formed by stacking a plurality of layers so that a flat flow passes through the cell, and is composed of (1) an aluminum plate used as an exterior plate, (2) a graphite plate socket having a hollow poly(methyl methacrylate) (PMMA) plate used as a current collector, (3) a silicone gasket configured to seal the cell and form a space for the capacitive electrodes, (4) the capacitive electrodes made of a graphite foil current collector coated with an activated carbon layer, (5) a CEM selective to cations (protons), (6) a Teflon gasket configured to form a space for a spacer, (7) a polymer spacer configured to guide the flow of a fluid with a membrane, and (8) an anion exchange membrane layer selective to anions (bicarbonate ions).

A porous carbon electrode was prepared by mixing activated carbon powder in a binder solution, and pretreatment was performed by immersing the carbon electrode in a carbon dioxide-containing solution or an MEA solution. An anion membrane and a cation membrane were immersed in a 0.25 M hydrochloric acid solution in the case of the CEM, and in a 0.25 M potassium bicarbonate ($KHCO_3$) solution in the case of the AEM for 24 hours, during which an immersion solution was replaced twice. A polymer spacer was used to form a flow path.

Two solutions were supplied to a pump through a spacer channel between the two ion exchange membranes, and a flow of the $CO_2$-flushed water and a flow of the air-flushed water were supplied alternately through the device in all experiments. These two steps constituted one cycle. The water was dissociated from different salts. In this case, the temperature was 20° C., and the setup operated at atmospheric pressure. It is possible to produce electricity by connecting the two electrodes through an external load Rext ($\Omega$), allowing electrons to flow between the electrodes. When exposed to the CO2-flushed water, the membrane potential will drive electrons from the anion specific electrode to the cation specific electrode. This transport of electronic charge leads to an excess charge in each electrode. To maintain electroneutrality, this excess charge is compensated by counter ion adsorption at the electrode surface, until equilibrium is reached between the membrane potential and the double layer potential and the cell voltage becomes zero. When the CO2-flushed solution is replaced by the air-flushed one, the new membrane potential will reverse these processes and drives the ions out of the electrodes, back into the flowing solution, until the system reaches its new equilibrium where again the cell potential is zero. This clear zero cell potential is typical for an energy-producing mode of operation of the cell. However, under open circuit condition there is no charge transport and there is thus no possibility for the electrode double layer potential to equilibrate with the membrane potential. As a consequence, the potential will only change as the result of the change in membrane potential, but it is not self-evident that a zero cell potential will be reached because the electrode potentials remain constant. Cycles can be repeated by alternatingly pumping the two solutions. Both the air flushed and $CO_2$ flushed solutions were prepared by gas sparging, as this is a simple technology easily applied in the laboratory. However, sparging is an energy intensive operation that has been extensively studied in wastewater treatment. There, the specific aeration efficiency is in the range 0.6-7.5 kg $O_2$/kWh depending on the technology applied. Even using the most efficient aeration technology we estimate we need around 300 kJ per kg $CO_2$ for a single solution. This calculation shows that the use of sparging to contact the gases with the electrolyte consumes more energy than is produced. The researcher team configured an electricity-generating device using ion to experimentally prove a principle of a process of obtaining electric energy in which dissolved carbon dioxide is dissociated into protons and bicarbonates and then diffused to different electrodes due to ion selectivity, and thus the resulting membrane potential leads to spontaneous production of electric current.

As seen in registered Korean Patent Nos. 131136, 1291768, and 1318331, research using pressure-retarded osmosis (PRO) in which electricity is generated by generating osmotic pressure 26 times higher than atmospheric pressure by using a concentration difference to pass freshwater toward seawater through a semipermeable membrane installed therebetween and reverse electrodialysis (RED) in which only specific ions selectively pass through a membrane has been conducted.

However, no research about production of electricity by using a carbon dioxide absorption tower to apply an absorption solution, in which carbon dioxide included in a combustion gas is absorbed, to an electricity-generating device using ion using seawater and freshwater has been attempted.

More specifically, at present, in the case of process technology for capturing carbon dioxide, technology development has focused on improvements in material performance and process efficiency for the past 40 years in order to reduce the energy required to regenerate chemical materials, and in the case of ion generating technology using a salinity difference, technology development has focused on improvements of membrane performance and a membrane module system in order to overcome the limitation on the amount of electricity that is generated with the low salinity of seawater (3.5%). To address the difficulty of developing these two technologies, processes of capturing carbon dioxide are operated through a combination of technology for capturing carbon dioxide and ion generating technology using a salinity difference. In this case, the heat energy necessary for reclamation is not required but a carbon dioxide absorption solution actually becomes a base material for generation of electricity, and a high amount of electric current is obtained with a high salt concentration difference. Therefore, it is thought that when these two problems are dramatically solved, a technical paradigm for solving global warming will be achieved.

Prior-Art Documents (Patent Document 1) registered Korean Patent No. 1157141

(Patent Document 2) registered Korean Patent No. 1316543

(Patent Document 3) registered Korean Patent No. 123938

(Patent Document 4) registered Korean Patent No. 712585

(Patent Document 5) registered Korean Patent No. 131136

(Patent Document 6) registered Korean Patent No. 1291768

(Patent Document 7) registered Korean Patent No. 1318331

(Article 1) H. V. M. Hamelers, et al., "Harvesting Energy from $CO_2$ Emissions", Environmental Science & Technology Letters, 2014, 1(1), pp 31-35

For these disclosures of the prior-art documents, since the inventive acts performed by the inventor(s) are no more than inducing the best combinations to solve the technical problems disclosed in a number of prior-art documents, and works themselves carried out to extract the prior-art documents manifesting such best combinations from a number of the prior-art documents are regarded as important as the inventive acts, the ease of extraction of the prior-art documents should also be considered to judge the inventive step. When the hindsight bias is involved in judging whether there are the difficulty in making changes to the configurations of the corresponding invention which are changed from those of the prior-art documents, the effects of the invention that can be relatively objectively evaluated and measured as a plan to reduce this bias should be considered to be secondary elements for judgment of the inventive step. Also, the objective data encompasses the development of techniques and patentability of related techniques, and thus the corresponding invention can be considered to be patentable when the related techniques are patented based on the objective data, and the inventive step of the corresponding invention can be intended to have the inventive step.

DISCLOSURE

Technical Problem

The present invention is designed for the above research, and it is an object of the present invention to provide an apparatus and process for capturing carbon dioxide with high efficiency using a self-generating power means in which electrical energy generated by the electricity-generating device using ion is used as energy for regenerating a saturated absorbent to stably operate a liquid absorption process for capturing carbon dioxide by applying a carbon dioxide capturing process and technology associated with an electricity-generating device using ion which utilizes seawater and freshwater.

Technical Solution

To solve the above problems, the present invention provides a carbon dioxide capturing apparatus using a self-generating power means, which includes an absorption tower 1 configured to absorb a gas including carbon dioxide through contact with an absorbent, an electricity-generating device using ion 7 configured to generate electricity by a potential difference caused due to a difference in concentration between a fluid solution and an absorption solution having absorbed carbon dioxide, and including a first flow path 7f and a second flow path 7g through which the fluid solution moves and an absorption solution flow path 7e through which the absorption solution having absorbed carbon dioxide moves between the first flow path and the second flow path, and a regeneration tower 20 configured to separate an regenerated absorption solution while the absorption solution having absorbed carbon dioxide is introduced into an upper portion of the regeneration tower 20 and flow down to a lower portion of the regeneration tower 20, and including a reheater 22 configured to supply a heat source for separation of carbon dioxide and operated by electricity generated at the electricity-generating device using ion and a condenser 21 configured to discharge evaporated steam and carbon dioxide after the steam is condensed and the carbon dioxide is cooled, wherein the carbon dioxide capturing apparatus forms a closed loop in which the regenerated absorption solution which has passed through the regeneration tower is supplied to the absorption tower by a second liquid transfer pump 6b.

The carbon dioxide capturing apparatus may further include a cation exchange membrane 7a formed between the first flow path and the absorption solution flow path, and an anion exchange membrane 7b formed between the second flow path and the absorption solution flow path.

The carbon dioxide capturing apparatus may further include a cation electrode 7c spaced apart from the cation exchange membrane and disposed to face the cation exchange membrane, and an anion electrode 7d spaced apart from the anion exchange membrane and disposed to face the anion exchange membrane.

The absorbent may include, as a solute, one or more selected from an aqueous electrolyte solution group consisting of amines, alkali metal bicarbonates, alkali carbonates, carbonates, hydroxides, borates, phosphates, nitrates, acids, and sodium chloride, and an organic electrolyte solution group consisting of propylene carbonate (PC), diethyl carbonate (DEC), and tetrahydrofuran (THF).

The amines may include primary amines, secondary amines, and ammonia.

Such amines may be in a liquid or solid phase at room temperature and atmospheric pressure, or may include gases with vapor pressure or in a mist phase. The primary amines may include saturated aliphatic primary amines such as methylamine, ethylamine, isopropylamine, propyl amine, butylamine, 2-aminoethanol, etc., unsaturated aliphatic primary amines such as allylamine, etc., alicyclic primary amines such as cyclopropylamine, etc., and aromatic primary amines such as aniline, etc. The secondary amines may include saturated aliphatic secondary amines such as dimethylamine, diethylamine, diisopropylamine, etc., unsaturated aliphatic secondary amines such as diallylamine, etc., and aromatic secondary amines such as methylaniline, etc.

Also, the amines may include ethyleneamine, ethanolamine (MEA), N—N-butylethanolamine (BEA), ethylenediamine (EDA), diethanolamine (DEA), diisopropanolamine (DIPA), N-methyldiethanolamine (MDEA), diglycolamine (DGA), triethanolamine (TEA), o-methylhydroxylamine, ethanimidamine, N-(2-hydroxyethyl)ethylenediamine (AEEA), diethanoltriamine (DETA), N,N-dimethylethanolamine (DMMEA), 2-4n diisopropanolamine or 2n methyldiethanolamine (ADIP), piperidine, piperazine, morpholine, pyrrolidine, 2,2,6,6, tetramethyl-4-piperidinol (TMP), 2-amino-2-methylpropanol (AMP), 1-amino-2-propanol (MIPA), 2-methylaminoethanol (MMEA), 3-amino-1-propanol (MPA), diethylaminoethanol (DEMEA), 2-diisopropylaminoethanol (DIPMEA), 2-diethylaminoethanol (DEAE), 2-(diisopropylamino)ethanol (DIPAE), 2-(dimethylamino)-2-methyl-propanol (DMAMP), N-ethyldiethanolamine (EDEA), N-isopropyldiethanolamine (IPDEA), N-tert-butyldiethanolamine ($^t$BDEA), 1-(2-hydroxyethyl) pyrrolidine (HEP), 1-(2-hydroxyethyl)piperidine (HEPD), 1-methyl-2-piperidineethanol (1M-2PPE), 1-ethyl-3-hydroxypiperidine (1E-3HPP), 2-{[2-(dimethylamino)ethyl]methylamino}ethanol (DMAEMAE), N,N,N',N'-tetrakis(2-hydroxyethyl)ethylenediamine (TKHEEDA), 2-[2-(dimethylamino)ethoxy]ethanol (DMAEE), bis[2-(N,N-dimethylamino)ethyl]ether (DAEE), 1,4-dimethylpiperazine (DMPZ), N,N,N',N'',N''-pentamethyldiethylenetriamine (PMDETA), N-methyl-N,N-bis[3-(dimethylamino)propyl] amine (PMDPTA), n-butyldiethanol amine (BDEA), triisopropanolamine (TIPA), 4-(2-hydroxyethyl)morpholine (HEM), hydroxyisopropylmorpholine (N-(2-Hydroxypropyl)morpholine) (HIPM), 2-(dibutylamino)ethanol (2-DBAE), 2,2-bis(hydroxymethyl)-2,2',2''-nitrilotriethanol (HMNTE), N-methyl-4-piperidinol (MP), hexamethylenetetramine (HMTA), N,N-dicyclohexylmethylamine (DCHMA), etc.

In addition, the amines may include sterically hindered amines KS-1, KS-2, and KS-3. Also, sterically hindered cyclic amines may include 1-amino-4-methyl piperazine, 1-(2-aminoethyl)-4-methyl piperazine, 1-(2-hydroxyethyl)-4-methyl piperazine, 1-(2-aminoethyl)-piperazine, 1-(2-hydroxyethyl)-piperazine, 2-aminoethyl-piperazine, 1-ethyl-piperazine, 2,5-dimethyl-piperazine, cis-2,6-dimethylpiperazine, 1,4-dimethyl-piperazine, trans-2,5-dimethyl-piperazine, 1-methyl piperazine, 2-methyl piperazine, 1-ethyl piperazine, 2-piperidineethanol, 3-piperidineethanol, 4-piperidineethanol, 2-aminoethyl-1-piperidine, and homopiperazine, etc.

The alkali carbonates may include potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), etc. Also, the alkali carbonates may include compounds from a Benfield process developed by the Union Carbide Corporation, a HIPure process known as the improved Benfield process, a Catacarb process developed by A. G. Eickmeyer, FLEXSORB HP developed by the Exxon Mobile Corporation, etc.

In addition, the nitrate may be sodium nitrate ($Na_2NO_3$). Also, the acids may include sulfuric acid ($H_2SO_4$), hydrochloric acid (HCl), etc.

The absorbent may further include, as an additive, an anticorrosive agent, a coagulant aid, an antioxidant, an oxygen ($O_2$) scavenger, an antifoaming agent, or a mixture thereof.

The absorbent may include, as a solvent, one or more selected from the group consisting of an aqueous solvent such as pure water, freshwater, brackish water, saline water, all of which are in the form in which water is present, or a mixed solvent of an alcohol and water, and an organic solvent group, for example, an aliphatic hydrocarbon such as hexane, etc.; an aromatic hydrocarbon such as benzene, toluene, xylene, methylnaphthalene, etc.; a heterocyclic compound such as quinolone, pyridine, etc.; a ketone such as acetone, methyl ethyl ketone, cyclohexanone, etc.; an ester such as methyl acetate, methyl acrylate, etc.; an amine such as diethylenetriamine, N,N-dimethylaminopropylamine, etc.; an ether such as diethyl ether, propylene oxide, tetrahydrofuran (THF), etc.; an amide such as N-methylpyrrolidone (NMP), dimethylformamide, dimethylacetamide, etc.; and a polar aprotic solvent such as hexamethylphosphoramide, dimethyl sulfoxide, etc.

Types of the solvent may be used without particular limitation as long as the solute can be dissolved or dispersed in the solvent, and either an aqueous solvent or an organic solvent may be used.

The aqueous solvent may, for example, include pure water, freshwater, brackish water, saline water, all of which are in the form in which water is present, or a mixed solvent of an alcohol and water.

Here, of water present in the natural world, seawater or water of a salt lake is saline water, and general inland water is freshwater. Inland water is distinct from pure water because inland water not is pure $H_2O$ but contains some salinity. A content of salinity increases in the order of freshwater, brackish water, and saline water. Brackish water refers to water in which seawater and freshwater are mixed in lakes or inlets on coasts, and refers to an intermediate between seawater and freshwater in terms of salt concentration.

The organic solvents may, for example, include an aliphatic hydrocarbon such as hexane, etc.; an aromatic hydrocarbon such as benzene, toluene, xylene, methylnaphthalene, etc.; a heterocyclic compound such as quinoline, pyridine, etc.; a ketone such as acetone, methyl ethyl ketone, cyclohexanone, etc.; an ester such as methyl acetate, methyl acrylate, etc.; an amine such as diethylenetriamine, N,N-dimethylaminopropylamine, etc.; an ether such as diethyl ether, propylene oxide, tetrahydrofuran (THF), etc.; an amide such as N-methylpyrrolidone (NMP), dimethylformamide, dimethylacetamide, etc.; a polar aprotic solvent such as hexamethylphosphoramide, dimethyl sulfoxide, etc.

The absorbent may include a solvent at 40 to 95% by weight and a solute at 5 to 60% by weight, and more preferably a solvent at 60 to 95% by weight and a solute at 5 to 30% by weight. General commercial-grade absorbents include water at 70% by weight and an amine at 30% by weight, and KIERSOL also includes water at 74% by weight and a solvent at 26% by weight.

The additive may be further included at 1% by weight or less, and more preferably at 0.1 to 0.5% by weight. In general, the additive is added in an amount within a range in which a desired effect as the absorbent may be achieved.

Also, the absorbent may be used as a solution in which the solvent, the solute and the additive are thoroughly mixed.

In addition, a pH value of the solution in which the solvent, the solute and the additive are thoroughly mixed is preferably in a range of pH 2 to 12.

The absorption solution having absorbed carbon dioxide, which is supplied to the absorption solution flow path, and the fluid solution which is supplied to the first flow path and the second flow path may be supplied alternately.

The absorption solution flow path and the fluid solution flow path may be formed in a pair of two or more flow paths, and the absorption solution having absorbed carbon dioxide and the fluid solution may be supplied in parallel.

The absorption solution flow path and the fluid solution flow path may be formed in a pair of two or more flow paths, and the absorption solution having absorbed carbon dioxide and the fluid solution may be supplied in series.

The absorption solution flow path and the fluid solution flow path may be formed in a pair of two or more flow paths, and the absorption solution having absorbed carbon dioxide and the fluid solution may be supplied through a honeycomb structure.

The absorption solution having absorbed carbon dioxide, which is supplied through the absorption solution flow path, may be an absorption solution that has or does not have absorbed carbon dioxide in the gas.

The absorption solution having absorbed carbon dioxide and the fluid solution, which are supplied to the electricity-generating device using ion, may be supplied in counter-flow or parallel-flow directions.

The carbon dioxide capturing apparatus may further include a heat exchanger 5 in which heat is exchanged when the absorption solution having absorbed carbon dioxide and the regenerated absorption solution pass through the heat exchanger 5.

The carbon dioxide capturing apparatus may further include a regenerated absorption solution condenser 23 configured to cool the regenerated absorption solution which has passed through the heat exchanger, and an absorption solution replenishing unit 24.

The electricity-generating device using ion may be possibly positioned at a place in which the absorption solution moves between the absorption tower and the regeneration tower.

The carbon dioxide capturing apparatus may further include a preheater 25 configured to heat the absorption solution having absorbed carbon dioxide before the absorption solution flows into the regeneration tower and operated by electricity generated at the electricity-generating device using ion.

The absorption solution having absorbed carbon dioxide, which is supplied to the heat exchanger, may be supplied by a first liquid transfer pump 6a, the regenerated absorption solution may be supplied by a second liquid transfer pump 6b, and the absorption solution having absorbed carbon dioxide, which is supplied to the regeneration tower, may be supplied by a third liquid transfer pump 6c.

Each of the absorption tower and the regeneration tower may include a filler 1a which comes in contact with the gas.

Also, the present invention provides a carbon dioxide capturing process using an self-generating power means, which includes absorbing a gas including carbon dioxide through contact with an absorbent; generating electricity by a potential difference caused due to a difference in concentration between a fluid solution and an absorption solution having absorbed carbon dioxide at an electricity-generating device using ion 7 which includes a first flow path 7f and a second flow path 7g through which the fluid solution moves; and an absorption solution flow path 7e through which the absorption solution having absorbed carbon dioxide moves between the first flow path and the second flow path; separating an regenerated absorption solution at a regeneration tower 20 while introducing the absorption solution having absorbed carbon dioxide into an upper portion of the regeneration tower 20 and flow down to a lower portion of the regeneration tower 20, wherein the regeneration tower 20 comprises a reheater 22 configured to supply a heat source for separation of carbon dioxide and driven by electricity generated at the electricity-generating device using ion; and a condenser 21 configured to discharge evaporated steam and carbon dioxide after the steam is condensed and the carbon dioxide is cooled; and forming a closed loop in which the regenerated absorption solution which has passed through the regeneration tower is supplied to the absorption tower by a second liquid transfer pump 6b.

Advantageous Effects

According to the present invention, carbon dioxide can be efficiently captured in places in which carbon dioxide is generated in large quantities to primarily prevent global warming, and carbon dioxide can be additionally used as an energy source by generating electricity using a generating power using ion system, while a process can be continuously operated in an economical manner by regenerating an absorbent.

In this process, there are advantages in that no energy needs to be supplied from the outside to regenerate an absorbent during treatment of continuously capturing greenhouse gases, costs of capturing carbon dioxide can be saved due to the high carbon dioxide absorption rate, and process efficiency can be maintained in a normal state because salt formation and layer separation do not occur and thus the absorbent does not need to be supplemented.

Also, in the present invention, electricity can be generated using a difference in concentration between a fluid solution and an absorption solution, and thus the present invention can be utilized as a power storage apparatus in which a peak load can be reduced by generating electricity according to the concentration difference when power consumption peaks.

Therefore, the present invention is expected in the future to contribute greatly to reducing greenhouse gases in response to global warming and generating electricity when the present invention itself is applied to novel absorbent processes for separating carbon dioxide from combustion exhaust gases at lower costs.

DESCRIPTION OF DRAWINGS

FIG. 1 is a configuration diagram of a carbon dioxide capturing device using a self-generating power means according to the present invention.

FIG. 2 is a conceptual diagram of the carbon dioxide capturing device using a self-generating power means according to the present invention.

FIG. 3 is a configuration diagram of a carbon dioxide capturing apparatus using a self-generating power means, which includes a heat exchanger, according to the present invention.

FIG. 4 shows results of power density and closed circuit voltage according to Example 1.

FIG. 5 shows results of changes in pH of an absorption solution and a fluid solution according to Example 1.

FIG. 6 shows results of changes in maximum energy, power density, closed circuit voltage, and pH according to Example 2.

BEST MODE

Hereinafter, preferred embodiments of the present invention will be described with reference to the accompanying drawings. It should be understood that it is possible for like elements to have like reference numerals even if they are shown in different drawings. When known functions and configurations are deemed to unnecessarily obscure the gist of the invention, detailed descriptions thereof will be omitted.

The present invention is largely composed of three parts, that is, an absorption tower configured to selectively absorb carbon dioxide, an electricity-generating device using ion configured to generate electricity by a difference in concentration between an absorption solution and a fluid solution, and a regeneration tower configured to separate a regenerated absorption solution from the absorption solution having absorbed carbon dioxide using energy produced at the electricity-generating device using ion as a heat source, and a configuration diagram of the present invention is shown in FIG. 1.

Also, the present invention is largely composed of four parts, that is, an absorption tower configured to selectively absorb carbon dioxide, a heat exchanger in which heat is exchanged between an absorption solution having absorbed carbon dioxide and an absorption solution that is regenerated by passing through an electricity-generating device using ion, an electricity-generating device using ion configured to generate electricity by a difference in concentration between an absorption solution and a fluid solution, and a regeneration tower configured to separate a regenerated absorption solution from the absorption solution having absorbed carbon dioxide using energy produced at the electricity-generating device using ion as a heat source, and a configuration diagram of the present invention is shown in FIG. 3. The components of the invention will be described.

First, an absorption tower 1 will be described. The absorption tower according to the present invention is a device configured to absorb carbon dioxide from a mixed gas 2 containing carbon dioxide through contact, and is configured so that an absorption solution is supplied to an upper portion of the absorption tower, and the absorption solution 4 having absorbed carbon dioxide is transferred from a lower portion of the absorption tower to a heat exchanger 5. The absorption tower may include a filler, and the absorption solution having absorbed carbon dioxide may be transferred to the heat exchanger by a liquid transfer pump.

In the heat exchanger 5, heat is exchanged between the absorption solution having absorbed carbon dioxide and the absorption solution that is regenerated at the regeneration tower by passing through the electricity-generating device using ion. Fluids flowing into the heat exchanger may be supplied in counter-flow or parallel-flow directions.

In the electricity-generating device using ion, as shown in FIG. 1, a space formed between a cation electrode 7c and an anion electrode 7d is divided by a cation exchange membrane 7a and an anion exchange membrane 7b. That is, the electricity-generating device using ion 7 includes a first flow path 7f formed between the cation exchange membrane 7a and the cation electrode 7c, a second flow path 7g formed between the anion exchange membrane 7b and the anion electrode 7d, and an absorption solution flow path 7e formed between the cation exchange membrane 7a and the anion exchange membrane 7b.

A fluid solution flows through the first flow path 7f and the second flow path 7g, and the absorption solution having absorbed carbon dioxide flows through the absorption solution flow path 7e.

The cation exchange membrane 7a is a dense membrane that blocks a stream of the absorption solution and through which only cations selectively pass, and the anion exchange membrane 7b is a dense membrane that blocks a stream of the absorption solution and through which only anions selectively pass.

The fluid solution may include an aqueous electrolyte such as NaCl, $H_2SO_4$, HCl, NaOH, KOH, $Na_2NO_3$, etc., and an organic electrolyte such as propylene carbonate (PC), diethyl carbonate (DEC), tetrahydrofuran (THF), etc.

In particular, one or more solvents selected from the group consisting of an aqueous solvent such as pure water, freshwater, brackish water, saline water, or a mixed solvent of an alcohol and water, and an organic solvent including an aliphatic hydrocarbon such as hexane, etc.; an aromatic hydrocarbon such as benzene, toluene, xylene, methylnaphthalene, etc.; a heterocyclic compound such as quinoline, pyridine, etc.; a ketone such as acetone, methyl ethyl ketone, cyclohexanone, etc.; an ester such as methyl acetate, methyl acrylate, etc.; an amine such as diethylenetriamine, N,N-dimethylaminopropylamine, etc.; an ether such as diethyl ether, propylene oxide, tetrahydrofuran (THF), etc.; an amide such as N-methylpyrrolidone (NMP), dimethylformamide, dimethylacetamide, etc.; and a polar aprotic solvent such as hexamethylphosphoramide, dimethyl sulfoxide, etc. may be used as the fluid solution.

Also, the absorption solution may move along the absorption solution flow path 7e, and the absorbent may include one or more selected from the group consisting of amines, alkali metal bicarbonates, alkali carbonates, carbonates, hydroxides, borates, and phosphates.

The amines may include primary amines, secondary amines, and ammonia. The amines may be in a liquid or solid phase at room temperature and atmospheric pressure, or may include gases with vapor pressure or in a mist phase. The primary amines may include saturated aliphatic primary amines such as methylamine, ethylamine, isopropylamine, propylamine, butylamine, 2-aminoethanol, etc., unsaturated aliphatic primary amines such as allylamine, etc., alicyclic primary amines such as cyclopropylamine, etc., and aromatic primary amines such as aniline, etc., and the secondary amine may include saturated aliphatic secondary amines such as dimethylamine, diethylamine, diisopropylamine, etc., unsaturated aliphatic secondary amines such as diallylamine, etc., and aromatic secondary amines such as methylaniline, etc.

Also, the amines may include ethyleneamine, ethanolamine (MEA), N—N-butylethanolamine (BEA), ethylenediamine (EDA), diethanolamine (DEA), diisopropanolamine (DIPA), N-methyldiethanolamine (MDEA), diglycolamine (DGA), triethanolamine (TEA), o-methylhydroxylamine, ethanimidamine, N-(2-hydroxyethyl)ethylenediamine (AEEA), diethanoltriamine (DETA), N,N-dimethylethlethanolamine (DMMEA), 2-4n diisopropanolamine or 2n methyldiethanolamine (ADIP), piperidine, piperazine, morpholine, pyrrolidine, 2,2,6,6, tetramethyl-4-piperidinol (TMP), 2-amino-2-methylpropanol (AMP), 1-amino-2-propanol (MIPA), 2-methylaminoethanol (MMEA), 3-amino-1-propanol (MPA), diethylaminoethanol (DEMEA), 2-diisopropylaminoethanol (DIPMEA), 2-diethylaminoethanol (DEAE), 2-(diisopropylamino)ethanol (DIPAE), 2-(dimethylamino)-2-methyl-propanol (DMAMP), N-ethyldiethanolamine (EDEA), N-isopropyldiethanolamine (IPDEA), N-tert-butyldiethanolamine (tBDEA), 1-(2-hydroxyethyl)pyrrolidine (HEP), 1-(2-hydroxyethyl)piperidine (HEPD), 1-methyl-2-piperidineethanol (1M-2PPE), 1-ethyl-3-hydroxypiperidine (1E-3HPP), 2-{[2-(dimethylamino)ethyl]methylamino}ethanol (DMAEMAE), N,N,N',N'-tetrakis(2-hydroxyethyl)ethylenediamine (TKHEEDA), 2-[2-(dimethylamino)ethoxy]ethanol (DMAEE), bis[2-(N,N-dimethylamino)ethyl]ether (DAEE), 1,4-dimethylpiperazine (DMPZ), N,N,N',N",N"-pentamethyldiethylenetriamine (PMDETA), N-methyl-N,N-bis[3-(dimethylamino)propyl]amine (PMDPTA), n-butyldiethanol amine (BDEA), triisopropanolamine (TIPA), 4-(2-hydroxyethyl)morpholine (HEM), hydroxyisopropylmorpholine (N-(2-hydroxypropyl)morpholine) (HIPM), 2-(dibutylamino)ethanol (2-DBAE), 2,2-bis(hydroxymethyl)-2,2',2"-nitrilotriethanol (HMNTE), N-methyl-4-piperidinol (MP), hexamethylenetetramine (HMTA), N,N-dicyclohexylmethylamine (DCHMA), etc.

In addition, the amines may be sterically hindered amines KS-1, KS-2, and KS-3. Also, sterically hindered cyclic amines may include 1-amino-4-methyl piperazine, 1-(2-aminoethyl)-4-methyl piperazine, 1-(2-hydroxyethyl)-4-methyl piperazine, 1-(2-aminoethyl)-piperazine, 1-(2-hydroxyethyl)-piperazine, 2-aminoethyl-piperazine, 1-ethylpiperazine, 2,5-dimethyl-piperazine, cis-2,6-dimethylpiperazine, 1,4-dimethyl-piperazine, trans-2,5-dimethylpiperazine, 1-methyl piperazine, 2-methyl piperazine, 1-ethyl piperazine, 2-piperidineethanol, 3-piperidineethanol, 4-piperidineethanol, 2-aminoethyl-1-piperidine, and homopiperazine, etc.

The alkali carbonates may include potassium carbonate ($K_2CO_3$), sodium carbonate ($Na_2CO_3$), sodium hydroxide (NaOH), potassium hydroxide (KOH), potassium bicarbonate ($KHCO_3$), sodium bicarbonate ($NaHCO_3$), etc. Also, the alkali carbonates may include compounds from a Benfield process developed by the Union Carbide Corporation, a HIPure process known as the improved Benfield process, a Catacarb process developed by A. G. Eickmeyer, FLEXSORB HP developed by the Exxon Mobil Corporation, etc.

In particular, the absorption solution may also include an aqueous electrolyte such as NaCl, $H_2SO_4$, HCl, NaOH, KOH, $Na_2NO_3$, etc., and an organic electrolyte such as propylene carbonate (PC), diethyl carbonate (DEC), and tetrahydrofuran (THF), similar to the fluid solution.

Particularly, one or more solvents selected from the group consisting of an aqueous solvent such as pure water, freshwater, brackish water, saline water, or a mixed solvent of an alcohol and water, and an organic solvent including an aliphatic hydrocarbon such as hexane, etc.; an aromatic hydrocarbon such as benzene, toluene, xylene, methylnaphthalene, etc.; a heterocyclic compound such as quinoline, pyridine, etc.; a ketone such as acetone, methyl ethyl ketone, cyclohexanone, etc.; an ester such as methyl acetate, methyl acrylate, etc.; an amine such as diethylenetriamine, N,N- dimethylaminopropylamine, etc.; an ether such as diethyl ether, propylene oxide, tetrahydrofuran (THF), etc.; an amide such as N-methylpyrrolidone (NMP), dimethylformamide, dimethylacetamide, etc.; and a polar aprotic solvent such as hexamethylphosphoramide, dimethyl sulfoxide, etc. may be used as the absorption solution.

The absorption solution and the fluid solution may be supplied in counter-flow or parallel-flow directions.

The cation electrode $7c$, the anion electrode $7d$, the cation exchange membrane $7a$ and the anion exchange membrane $7b$ may be used without limitation as long as they are used for conventional fluidized-bed electrode systems (cells, batteries, etc.), and may be properly selected and used by those skilled in the related art, depending on the purpose of use and conditions.

The regeneration tower uses electric energy produced at the electricity-generating device using ion to drive a reheater in order to separate an absorption solution regenerated while the absorption solution having absorbed carbon dioxide is being allowed to flow in from an upper portion of the regeneration tower and flow down to a lower portion of the regeneration tower. In this case, the regeneration tower is configured to discharge evaporated steam and carbon dioxide after the steam is condensed and the carbon dioxide is cooled.

Next, embodiments of the present invention in which the carbon dioxide capturing apparatus using an self-generating power means is used will be described.

In FIG. 3, reference numbers 1, 5, 7, and 20 represent an absorption tower 1, a heat exchanger 5, an electricity-generating device using ion 7, and a regeneration tower 20, respectively.

The absorption tower 1 may include a flow path 2 for an exhaust gas containing carbon dioxide, a flow path 3 for an exhaust gas which has passed through the absorption tower, a flow path 10 for a regenerated absorption solution supplied to the absorption tower through the heat exchanger 5, a flow path 4 for an absorption solution having absorbed carbon dioxide, which is discharged from a lower portion of the absorption tower, a filler $1a$ that comes in contact with a gas in the absorption tower, and a first liquid transfer pump $6a$ configured to transfer the absorption solution having absorbed carbon dioxide to the heat exchanger.

In the heat exchanger 5, heat is exchanged when the absorption solution having absorbed carbon dioxide and the regenerated absorption solution which has passed through the electricity-generating device using ion pass through the heat exchanger.

In the electricity-generating device using ion 7, a space formed between the cation electrode $7c$ and the anion electrode $7d$ is divided by the cation exchange membrane $7a$ and the anion exchange membrane $7b$. That is, the electricity-generating device using ion 7 includes a first flow path $7f$ formed between the cation exchange membrane $7a$ and the cation electrode $7c$, a second flow path $7g$ formed between the anion exchange membrane $7b$ and the anion electrode $7d$, and an absorption solution flow path $7e$ formed between the cation exchange membrane $7a$ and the anion exchange membrane $7b$.

The regeneration tower 20 includes a preheater 25 configured to preheat and supply a carbon dioxide absorption solution, a reheater 22 in which electricity generated at the electricity-generating device using ion is used as a heat source, and a condenser 21 configured to discharge evaporated steam and after the steam is condensed and the carbon dioxide is cooled.

Also, the regenerated absorption solution that has passed through the heat exchanger may pass through a regenerated absorption solution condenser 23 prior to flowing into the absorption tower, and a regenerated absorption solution replenishing unit 24 configured to replenish shortages of the absorption solution may be further configured.

In the absorption tower 1, an absorption solution having a higher concentration than a fluid solution flowing in the first flow path $7f$ and the second flow path $7g$ is supplied to the absorption solution flow path $7e$ of the electricity-generating device using ion, or an absorption solution having a lower concentration than a fluid solution flowing in the first flow path $7f$ and the second flow path $7g$ is supplied to the absorption solution flow path $7e$. Therefore, an ion concentration of the absorption solution passing through the absorption solution flow path $7e$ may decrease or increase.

Then, an ammeter 8 configured to measure electric energy is connected with the electricity-generating device using ion, and thus may measure a potential difference generated by the concentration difference in an ion generating cell.

Therefore, when the absorption solution having a relatively high concentration and the fluid solution having a relatively low concentration are supplied to the electricity-generating device using ion, cations and anions move toward the absorption solution from the first flow path $7f$ and the second flow path $7g$ having a low concentration to the cation electrode $7c$ and the anion electrode $7d$ through the catio exchange membrane $7a$ and the anion exchange membrane $7b$, so that a potential difference is generated by the moving cations and anions.

On the other hand, when the absorption solution having a relatively low concentration and the fluid solution having a relatively high concentration are supplied to the electricity-generating device using ion, cations and anions move toward the absorption solution from the first flow path $7f$ and the second flow path $7g$ having a high concentration to the cation electrode $7c$ and the anion electrode $7d$ through the cation exchange membrane $7a$ and the anion exchange membrane $7b$, so that a potential difference is generated.

A conceptual diagram of the present invention is shown in FIG. 2. An absorption process of the present invention operates in a temperature range of 5 to 80° C., a pressure range of atmospheric pressure to 20 atm and a range of a molar flux ratio (liquid/gas) of 2.0 to 10. Also, an ion exchange membrane process of the electricity-generating device using ion of the present invention operates in a temperature range of 5 to 80° C. and a pressure range of atmospheric pressure to 20 atm, and also operates in a range of a volumetric flow ratio (saline water:freshwater:electrolyte) of 2:1.0 to 2.0:2. It is possible to obtain effects of reducing greenhouse gases by removing carbon dioxide from exhaust gases and of producing electricity by inputting an absorbent which absorbs carbon dioxide to the electricity-generating device using ion which uses a concentration difference to generate a potential difference and thus operating a system without supplying external energy using the generated electricity as renewable energy, depending on the concept that a gas including carbon dioxide is absorbed by an absorption solution in the absorption tower, the absorption solution which has a high concentration and has absorbed carbon dioxide and freshwater which has a low concentration are supplied to the electricity-generating device using ion which uses the concentration difference, electricity is generated by generating the potential difference in the electricity-generating device using ion in which only ions selectively permeate, and then energy required to regenerate an absorbent at the regeneration tower is applied using the electricity generated at the electricity-generating device using ion as a heat source.

MODE FOR INVENTION

Example 1

In Example 1 of the present invention, a carbon dioxide absorbing device that is capable of producing electricity and is configured of five each of a cation exchange membrane (commercially available from Fumatech and Astom Corporation) and an anion exchange membrane (commercially available from Fumatech) between rectangular positive and negative electrodes (graphite electrodes) having a microflow path, a spacer, an absorption solution (KIERSOL: a mixture including 15% by weight of $K_2CO_3$, 10% by weight of 2-methylpiperazine, and water), a vessel with a stirrer through which carbon dioxide is reacted (10 mL/min, 200 rpm, 40° C.), a vessel for inputting freshwater (10 mL/min) and a vessel for circulating an electrolyte (a mixed solution of ferrocyanide and NaCl:Fe(CN)$_6^{3-/4-}$ 50 mM, 20 mL/min), was manufactured.

A total generated energy, the voltage, and the maximum power density per unit area of an exchange membrane were measured to be 0.05 W, 0.5 to 0.54 V, and 0.8 W/m$^2$, respectively. FIG. 4 illustrates values of power density and closed circuit voltage according to reaction time. It can be seen that a power density value was 0.7 to 0.8 W/m$^2$ within a measurement time. It was revealed that the generated energy per unit cell when KIERSOL was used as an absorbent was 300 kJ/(ton of KIERSOL).

As shown in FIG. 5, it can be seen that a pH value of freshwater passing through an ion reactor decreased to pH 7.2 from pH 8.0 before passing through the ion reactor, and a pH value of the absorbent KIERSOL increased to pH 8.4 from pH 7.9 before passing through the ion reactor. Therefore, it was revealed that $HCO_3^-$ and $H^+$ ions were transferred through an ion exchange membrane, and as a result, an absorption solution became basic as the absorption solution was regenerated, and a fluid solution became acidic as the fluid solution was regenerated.

Example 2

Referring to FIG. 6, the experimental results of the carbon dioxide capturing apparatus capable of producing electricity were able to be confirmed. An experiment was performed using a selective ion exchange membrane (0.0071 m$^2$) commercially available from Fumatech, a graphite electrode, five stacks of exchange membranes, a spacer (0.2 mm), saline water (10 mL/min), freshwater (5 mL/min), and an electrolyte (10 mL/min) were used.

It was revealed that a KIERSOL solution was measured to have a voltage of 0.3 to 0.4 V and a power density value of 0.3 to 0.4 W/m$^2$. Also, it was revealed that a KIERSOL solution having absorbed carbon dioxide was measured to have a voltage of 0.5 V and a power density value of 0.7 to 0.8 W/m$^2$.

Although the present invention has been described above in detail with reference to preferred examples thereof, it will be understood by those skilled in the art that various changes and modifications can be made to the detailed description and specific examples of the present invention without departing from the spirit and scope of the invention as defined by the appended claims.

The invention claimed is:

1. A carbon dioxide capturing apparatus using a self-generating power means, comprising:
   an absorption tower (1) configured to absorb a gas including carbon dioxide through contact with an absorbent;
   an electricity-generating device (7) configured to generate electricity by a potential difference caused due to a difference in concentration between a fluid solution and an absorption solution having absorbed carbon dioxide, and comprising a space formed between a cation electrode (7c) and an anion electrode (7d), the space being divided by a cation exchange membrane (7a) and an anion exchange membrane (7b), a first flow path (7f) between the cation exchange membrane (7a) and the cation electrode (7c) through which the fluid solution moves, a second flow path (7g) between the anion exchange membrane (7b) and the anion electrode (7d) through which the fluid solution moves, and an absorption solution flow path (7e) between the first flow path and the second flow path through which the absorption solution having absorbed carbon dioxide moves; and
   a regeneration tower (20) configured to separate an regenerated absorption solution in which the absorption solution having absorbed carbon dioxide is introduced into an upper portion of the regeneration tower (20) and flows down to a lower portion of the regeneration tower (20), and comprising a reheater (22) configured to supply a heat source for separation of carbon dioxide and operated by electricity generated at the electricity-generating device; and a condenser (21) configured to discharge evaporated steam and carbon dioxide after the steam is condensed and the carbon dioxide is cooled,
   wherein the regenerated absorption solution which has passed through the regeneration tower is supplied to the absorption tower by a second liquid transfer pump (6b), and
   wherein, when the absorption solution having a relatively higher concentration than the fluid solution or the absorption solution having a relatively lower concentration than the fluid solution is supplied to absorption solution flow path (7e), a cation passes through the cation exchange membrane and an anion passes through the anion exchange membrane due to the difference in concentration between the fluid solution and the absorption solution having absorbed carbon dioxide.

2. The carbon dioxide capturing apparatus of claim 1, wherein the cation electrode (7c) is disposed to face the cation exchange membrane, and the anion electrode (7d) is disposed to face the anion exchange membrane.

3. The carbon dioxide capturing apparatus of claim 1, wherein the absorbent comprises, as a solute, one or more selected from an aqueous electrolyte solution group consisting of amines, alkali metal bicarbonates, alkali carbonates, carbonates, hydroxides, borates, phosphates, nitrates, acids, and sodium chloride, and an organic electrolyte solution group consisting of propylene carbonate (PC), diethyl carbonate (DEC), and tetrahydrofuran (THF).

4. The carbon dioxide capturing apparatus of claim 1, wherein the electricity-generating device is positioned at a place in which the absorption solution moves between the absorption tower and the regeneration tower.

5. The carbon dioxide capturing apparatus of claim 1, further comprising a preheater (25) configured to heat the absorption solution having absorbed carbon dioxide before the absorption solution flows into the regeneration tower and operated by electricity generated at the electricity-generating device.

6. The carbon dioxide capturing apparatus of claim 1, wherein the absorbent further comprises, as an additive, an anticorrosive agent, a coagulant aid, an antioxidant, an oxygen ($O_2$) scavenger, an antifoaming agent, or a combination thereof.

7. The carbon dioxide capturing apparatus of claim 6, wherein the additive is further comprised at 1 wt % or less.

8. The carbon dioxide capturing apparatus of claim 1, further comprising a heat exchanger (5) in which heat is exchanged while the absorption solution having absorbed carbon dioxide and the regenerated absorption solution are passing through the heat exchanger (5).

9. The carbon dioxide capturing apparatus of claim 8, further comprising a regenerated absorption solution condenser (23) configured to cool the regenerated absorption solution which has passed through the heat exchanger, and an absorption solution replenishing unit (24).

10. The carbon dioxide capturing apparatus of claim 1,
wherein the absorbent comprises, as a solvent, one or more selected from an aqueous solvent group or an organic solvent group,
wherein the aqueous solvent group consists of pure water, freshwater, brackish water, saline water, all of which are in the form in which water is present, and a mixed solvent of an alcohol and water,
wherein the organic solvent group consists of an aliphatic hydrocarbon group consisting of hexane; an aromatic hydrocarbon group consisting of benzene, toluene, xylene, and methylnaphthalene; a heterocyclic compound group consisting of quinoline and pyridine; a ketone group consisting of acetone, methyl ethyl ketone, and cyclohexanone; an ester group consisting of methyl acetate and methyl acrylate; an amine group consisting of diethylenetriamine and N,N-dimethylaminopropylamine; an ether group consisting of diethyl ether, propylene oxide, and tetrahydrofuran (THF); an amide group consisting of N-methylpyrrolidone (NMP), dimethylformamide, and dimethylacetamide; and a polar aprotic solvent group consisting of hexamethylphosphoramide and dimethyl sulfoxide.

11. The carbon dioxide capturing apparatus of claim 10, wherein the absorbent comprises the solvent at 40 to 95 wt % and the solute at 5 to 60 wt %.

12. The carbon dioxide capturing apparatus of claim 11, wherein a mixed solution of the solvent, the solute and the additive has a pH value ranging from pH 2 to 12.

* * * * *